United States Patent
Gauthier (10) Patent No.: US 10,203,031 B2
(45) Date of Patent: Feb. 12, 2019

(54) SYSTEM AND METHOD FOR CHANGING DRIVING MODES USING NAVIGATION AND CONTROL

(71) Applicant: Toyota Motor Engineering & Manufacturing North America, Inc., Erlanger, KY (US)

(72) Inventor: Christopher T. Gauthier, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 300 days.

(21) Appl. No.: 15/214,292

(22) Filed: Jul. 19, 2016

(65) Prior Publication Data

US 2018/0023692 A1    Jan. 25, 2018

(51) Int. Cl.
| | |
|---|---|
| *F16H 61/02* | (2006.01) |
| *F16H 59/44* | (2006.01) |
| *F16H 59/58* | (2006.01) |
| *F16H 59/66* | (2006.01) |
| *F16H 59/54* | (2006.01) |

(52) U.S. Cl.
CPC ......... *F16H 61/0213* (2013.01); *F16H 59/44* (2013.01); *F16H 59/54* (2013.01); *F16H 59/58* (2013.01); *F16H 59/66* (2013.01); *F16H 2059/663* (2013.01); *F16H 2059/666* (2013.01); *F16H 2061/0227* (2013.01)

(58) Field of Classification Search
CPC ...... F16H 61/0213; F16H 59/66; F16H 59/58; F16H 59/44; F16H 59/54; F16H 2059/666; F16H 2059/663; F16H 2061/0227
See application file for complete search history.

(56) References Cited

U.S. PATENT DOCUMENTS

| | | | |
|---|---|---|---|
| 5,089,963 | A | 2/1992 | Takahashi |
| 5,911,771 | A | 6/1999 | Reichart et al. |
| 6,098,005 | A | 8/2000 | Tsukamoto et al. |
| | | (Continued) | |

FOREIGN PATENT DOCUMENTS

KR    2015028878 A    3/2015

OTHER PUBLICATIONS

Masao Kawai et al.; "*Development of a Shift Control System for Automatic Transmissions Using Information from a Vehicle Navigation System*"; The Engineering Society for Advancing Mobility Land Sea Air and Space International; International Congress and Exposition, Mar. 1-4, 1999; 10 pages.

*Primary Examiner* — David J Hlavka
(74) *Attorney, Agent, or Firm* — Snell & Wilmer LLP (57) ABSTRACT

Methods, systems, and apparatus for automatically changing vehicle driving modes. An automatic shift control system includes a transmission configured to provide engine output for movement of the vehicle and a navigation unit configured to obtain navigational information including a current location of the vehicle. The automatic shift control system includes an electronic control unit (ECU) connected to the navigation unit. The ECU is configured to determine a current route having multiple segments based on the current location and a destination location and determine a shift schedule based on a driver behavior pattern. The ECU is configured to control the transmission to cause shifts of the transmission based on the shift schedule and the current location.

20 Claims, 6 Drawing Sheets

(56) References Cited

U.S. PATENT DOCUMENTS

| | | | |
|---|---|---|---|
| 6,199,001 B1 * | 3/2001 | Ohta | B60K 31/0058 |
| | | | 701/409 |
| 6,470,265 B1 | 10/2002 | Tanaka | |
| 6,684,143 B2 | 1/2004 | Graf et al. | |
| 7,444,311 B2 | 10/2008 | Engstrom et al. | |
| 7,505,842 B2 | 3/2009 | Luh | |
| 8,026,835 B2 | 9/2011 | Denaro | |
| 8,204,680 B1 | 6/2012 | Dorum | |
| 8,543,302 B2 | 9/2013 | Yoshikawa et al. | |
| 8,954,232 B2 | 2/2015 | Takeuchi et al. | |
| 9,043,104 B2 | 5/2015 | Kiefer et al. | |
| 9,297,455 B2 | 3/2016 | Li | |
| 2010/0030437 A1 * | 2/2010 | Kim | F16H 61/0213 |
| | | | 701/65 |

* cited by examiner

SYSTEM AND METHOD FOR CHANGING DRIVING MODES USING NAVIGATION AND CONTROL

BACKGROUND

1. Field

This invention relates to a system and a method for automatically changing vehicle driving modes.

2. Description of the Related Art

A transmission converts engine output into torque to move the vehicle. The transmission utilizes discrete gear states to convert the engine output. By controlling the gear states, the transmission impacts drivability and fuel efficiency of the vehicle.

Adaptive shift control operates the transmission and selects an appropriate gear depending on the road condition. For example, when traveling uphill, the adaptive shift control maintains a lower gear that suits the degree of incline to allow for smooth driving of the vehicle. In another example, the adaptive shift control shifts to a lower gear when traveling downhill to increase engine braking and in electric vehicles to store and/or reuse the power that is generated due to regenerative braking. The adaptive shift control may shift into a higher gear to reduce engine braking if there is no traffic or if the speed limit allows for increased fuel economy. The adaptive shift control may also disconnect the transmission to reduce losses from engine braking. The use of adaptive shift control increases fuel efficiency and/or drivability. However, adaptive shift control is a reactive system that responds to the current road conditions and/or user inputs.

Accordingly, there is a need for a system and a method for automatically predicting and changing the driving modes of a vehicle to further improve fuel efficiency, drivability and performance.

SUMMARY

In general, one aspect of the subject matter described in this specification is embodied in an automatic shift control system for a vehicle. The automatic shift control system includes a transmission configured to provide engine output for movement of the vehicle and a navigation unit configured to obtain navigational information including a current location of the vehicle. The automatic shift control system includes an electronic control unit (ECU) connected to the navigation unit, the ECU configured to determine a current route having a plurality of segments based on the current location and a destination location and determine a shift schedule that includes a respective transmission shift command for a respective segment of the plurality of segments based on a driver behavior pattern. The ECU is configured to control the transmission to cause shifts of the transmission based on the shift schedule and the current location.

These and other embodiments may optionally include one or more of the following features. The ECU may be configured to match the respective segment of the current route to a corresponding previously-driven segment to determine a shift schedule for the respective segment. The ECU may be configured to determine the respective transmission shift command for the respective segment by associating the driver behavior pattern of the corresponding previously-driven segment with a driving mode. The driver behavior patterns may be associated with a time of day and a day of the week when the corresponding previously-driven segment was driven. The shift schedule may be based on the current time of day and the day of the week. The ECU may collect a current driver behavior pattern associated with the current route and adjust the shift schedule based on the current driver behavior pattern.

The automatic shift control system may include one or more sensors. The one or more sensors may be configured to obtain a driver behavior pattern for a previously-driven segment of multiple segments for multiple previously driven routes. The automatic shift control system may include a memory configured to store the driver behavior patterns for each segment of the multiple previously-driven segments. The driver behavior patterns may include at least one of steering angle information, vehicle speed information or braking information of the previously-driven segment. The one or more sensors may be configured to detect at least one of a road condition or a traffic condition for the respective segment, and the shift schedule may be based on the at least one of the road condition or the traffic condition for the respective segment. The road condition may include at least one of a grade level for the respective segment, a degree of curvature for the respective segment or an estimated cruising speed. The traffic condition includes an estimated density of traffic for the respective segment.

The transmission shift command may be a signal to the transmission to enter into a specific driving mode such as a sport mode, a sport-plus mode, an economy mode, an economy-plus mode or a normal mode.

In another aspect, the subject matter is embodied in a method for controlling a transmission of a vehicle. The method includes collecting and storing one or more driving modes for multiple previously-driven segments for a previously driven route. The method includes determining a route having multiple segments based on a current location of the vehicle and a destination location. The method includes determining a driving mode of a respective segment of the multiple segments based on a current location and a corresponding previously-driven segment. The method includes controlling operations of the vehicle while traveling the respective segment of the route based on the driving mode of the respective segment.

In another aspect, the subject matter is embodied in a method for controlling a transmission of a vehicle. The method includes obtaining navigational information including a current location of the vehicle and determining a route based on the current location and a destination location. The method includes determining a plurality of segments for the route based on at least one of the navigational information or user input and determining a shift schedule for the route. The shift schedule includes a driving mode for each segment of the plurality of segments. The transmission shift command for each segment of the plurality of segments being based on additional user input.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems and methods for automatically changing vehicle driving modes. Particular embodiments of the subject matter described in this specification may be implemented to realize one or more of the following advantages. An automatic shift control system determines a shift schedule to control the transmission to increase drivability, performance, responsiveness and/or maximize fuel efficiency. The automatic shift control system collects and stores driver behavior patterns and determines an appropriate driving mode for each segment of a current route. By predetermining or predicting a driving mode for each segment of the current route, the automatic shift control system improves drivability, performance, responsiveness and/or fuel efficiency of a road trip.

The automatic shift control system minimizes the need for a driver to manually change between various driving modes while driving. The automatic shift control system automatically adjusts the touch and feel of a road trip to allow for more sensitive and finely tuned adjustments in real-time that increase drivability, performance, responsiveness and/or fuel efficiency. For example, the automatic shift control system may take into account road conditions and traffic conditions and adjust the shift control schedule of the transmission to maximize drivability, performance, responsiveness and/or fuel efficiency. The result is a smoother vehicle driving experience. In another example, the automatic shift control system may automatically switch between driving modes during a road trip to accommodate driver behavior patterns to allow for a more enjoyable ride.

Other benefits and advantages include manual programming of the shift schedule for a customized ride to allow a driver to have a unique driving experience. By shifting between different modes at particular locations, a driver maximizes fuel efficiency during particular segments of a road trip and/or maximizes drivability during other segments of a road trip. For example, on an empty highway, the shift schedule may be set to an economy mode to conserve fuel while the shift schedule may be set to a sport mode on a curved segment to maximize drivability, performance and responsiveness and improve the driving experience of the driver.

Figure 1:
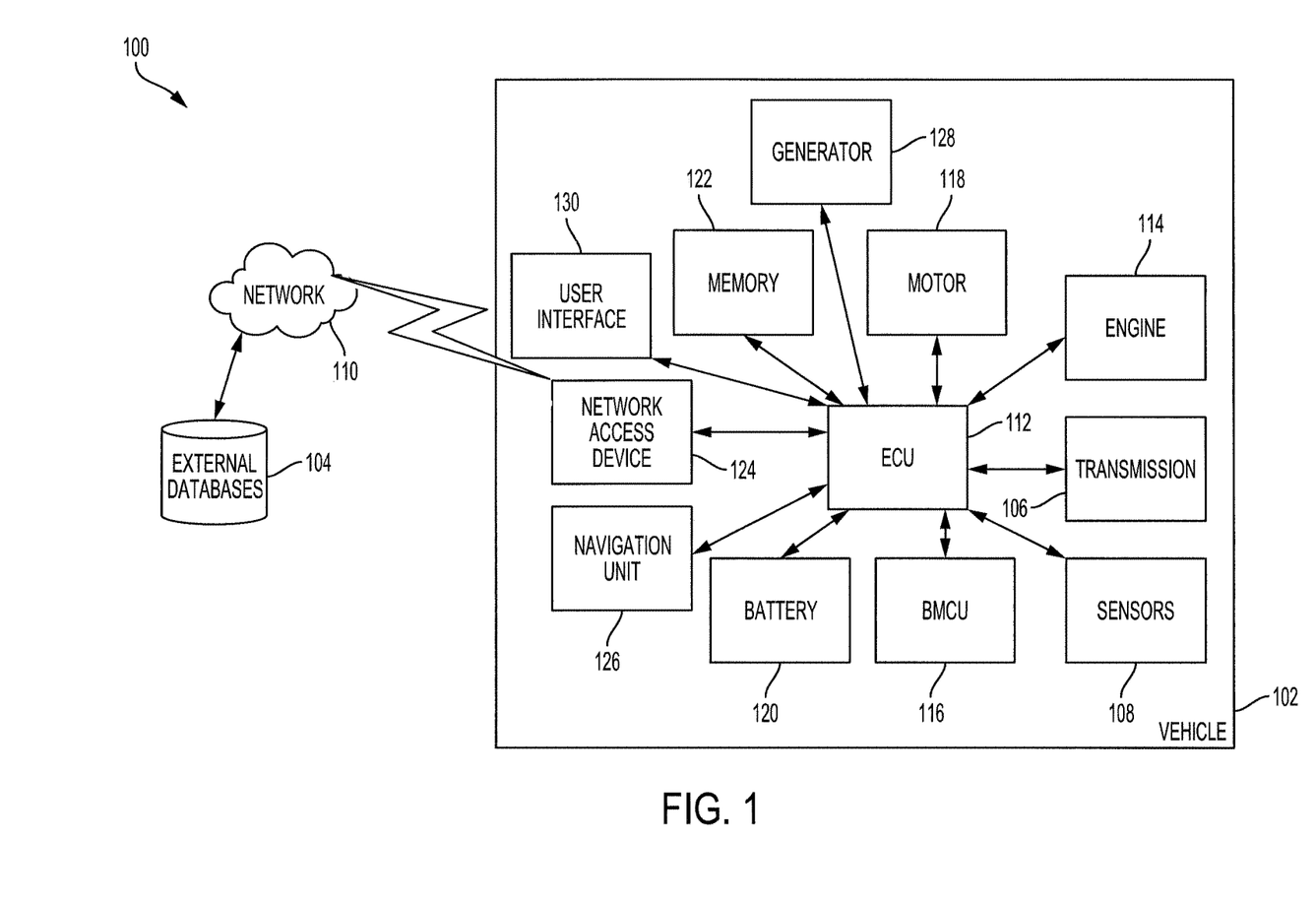
FIG. 1 is a block diagram of an example automatic shift control system for a vehicle according to an aspect of the invention.

FIG. 1 is a block diagram of an automatic shift control system 100 for a vehicle 102. The automatic shift control system 100 may include one or more computers or electronic control units (ECUs) 112, appropriately programmed, to control shifting of the transmission 106.

The automatic shift control system 100 may be included in a vehicle 102 and connected to one or more external databases 104 through a network 110. The vehicle 102 is a conveyance capable of transporting a person or persons or any material or any permanently or temporarily affixed apparatus. The vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle, a hydrogen fuel cell vehicle or any other type of vehicle that includes a motor 118 and/or a generator 128. Other examples of vehicles include bicycles, trains, planes, or boats, and any other form of conveyance that is capable of transportation. A vehicle, e.g., the vehicle 102, may be semi-autonomous or autonomous. That is, the vehicle 102 may be self-maneuvering and navigate without human input. An autonomous vehicle may use one or more sensors 108 and/or navigation unit 126 to drive autonomously.

The vehicle 102 may be coupled to a network 110. The network 110, such as a local area network (LAN), a wide area network (WAN), a cellular network, a digital short-range communication (DSRC), the Internet, or a combination thereof, connects the vehicle 102 to the one or more external databases 104. The external databases 104 may include databases from different service providers. A service provider may provide navigational map, roadway and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include political and terrain information. Political information includes political features such as cities, states, zoning ordinances, laws and regulations, and traffic signs or signals. For example, laws and regulations may include the regulated speed on different portions of a road or noise ordinances. Terrain information includes terrain features such as bridges, mountains, hills, water bodies or plains.

Roadway information may include road features, e.g., on-ramps, highways, tunnels, bridges, a curvy road, a straight road, or a mountainous road. Roadway features may also include information on potholes, speed bumps, inclination of a roadway and/or a road condition, such as ice on the road, a degree of curvature of the road, and/or an incline or a decline of a road.

Traffic condition information includes one or more traffic condition features. The traffic condition information may include information related to the density and movement of vehicles on a roadway, construction information, accident information, or information about vehicles in public/private structures that typically have congestion during specific hours or after specific events. Traffic condition features may include traffic congested areas, construction areas, or accident areas. Features, e.g., terrain features, roadway features, political features, or traffic condition features, each have a location that may be identified by map coordinates. The map coordinates may be defined by latitude and longitudinal coordinates.

The navigation unit 126 may be coupled to the ECU 112 and obtain from the external databases 104 the navigational map information and/or the time information. The navigation unit 126 may include a Global Positioning System (GPS) device that provides a current location and/or a current time.

The automatic shift control system 100 includes features that allow it to learn the driver's route over time so that the future shifting events may be predicted and/or stored in a memory 122. The vehicle 102 may include an engine 114, a motor 118, a generator 128, an electronic control unit (ECU) 112, a memory 122, and a battery management and control unit (BMCU) 116. The vehicle 102 may also include a network access device 124, one or more sensors 108, and a user interface 130.

The motor 118 and/or the generator 128 may be an electric motor and an electric generator that converts electrical energy into mechanical power, such as torque, and converts mechanical power into electrical energy. The motor 118 and/or the generator 128 may be coupled to the battery 120. The motor 118 and/or the generator 128 may convert the energy from the battery 120 into mechanical power, and may provide energy back to the battery 120, for example, via regenerative braking. In some implementations, the vehicle 102 may include one or more additional power generation devices, such as the engine 114. The engine 114 combusts fuel to provide power instead of and/or in addition to the power supplied by the motor 118 and/or the generator 128.

The ECU 112 may be electrically coupled to some or all of the components of the vehicle 102. The ECU 112 may include one or more processors or controllers specifically designed for automotive applications and systems. The functions and operations of the ECU 112 may be implemented by a single ECU or by multiple ECUs. The ECU 112 may receive data from one or more components and control the operations of the one or more components based on the received or determined data. For example, the ECU 112 may receive data from the user interface 130, the one or more sensors 108, and/or the network access device 124 and integrate the data received from each of these devices to predict a shift event. The ECU 112 may control the functions and operations of the BMCU 116 to charge and/or discharge the battery 120.

The ECU 112 may be coupled to a user interface 130 that performs user input and output. The user interface 130 displays, for example, status information related to the driving mode and shift events. The user interface 130 may include user interface elements to receive user input, such as a button, a dial, a microphone, a touchpad, or a touch screen, and/or any device capable of output, e.g., a display, a personal device, a tablet, a laptop, a speaker, or a refreshable braille display. The user interface 130 allows a driver or a passenger of the vehicle 102 to communicate with the ECU 112. For example, the driver may be able to provide data to the ECU 112 and/or receive feedback from the ECU 112 via the user interface 130.

The memory 122 may be coupled to the ECU 112. The memory 122 may store instructions to execute on the ECU 112 and may include one or more of a RAM or other volatile or non-volatile memory. The memory 122 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 110, to which the external databases 104 are also connected.

The one or more sensors 108 may include a vehicle speed sensor, an acceleration input sensor, a yaw rate sensor, a braking sensor, a steering angle sensor and/or a gravitational force (g-force) sensor for cornering, lateral and longitudinal directions.

The battery 120 may be coupled to the motor 118 and/or the generator 128 and may provide electrical energy to and receive electrical energy from the motor 118 and/or the generator 128. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

Figure 2:
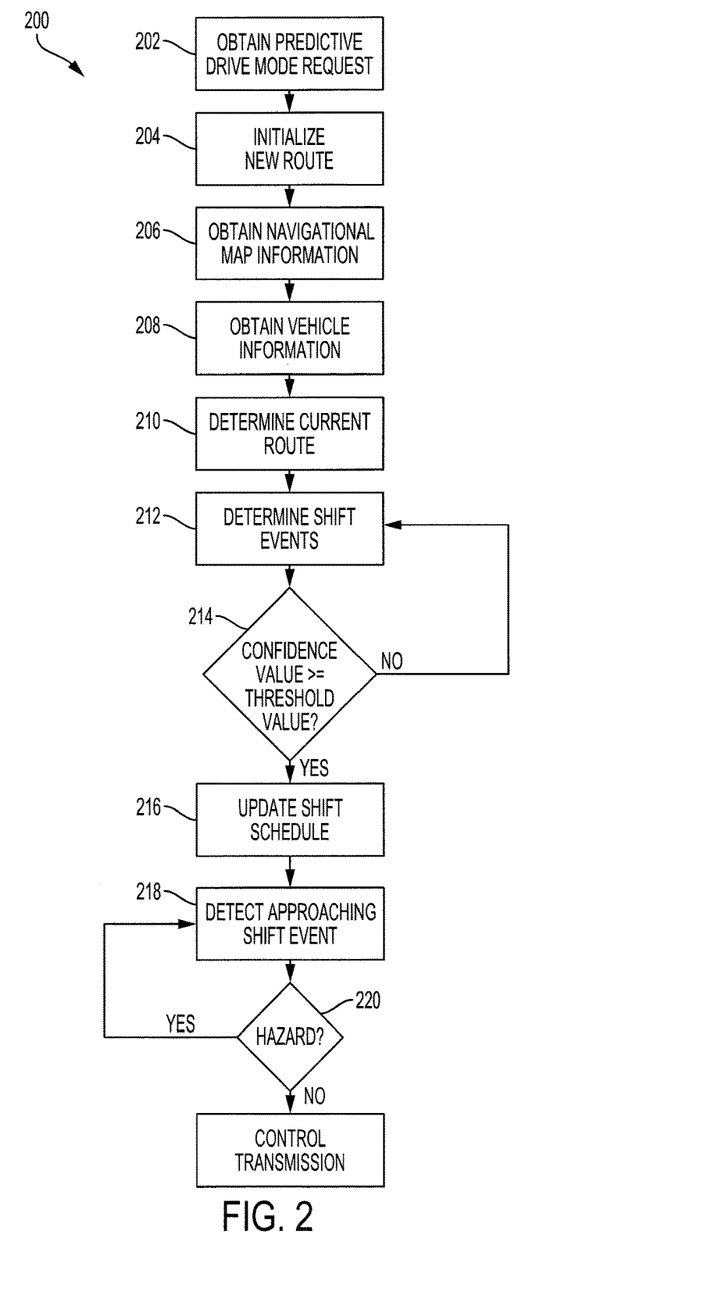
FIG. 2 is a flow diagram of an example process for preparing a vehicle for a shift event according to an aspect of the invention.

FIG. 2 is a flow diagram of an example process for preparing a vehicle for a shift event. One or more computers or data processing apparatuses, for example, the ECU 112 of the vehicle 102, appropriately programmed, may implement and execute the process 200.

The automatic shift control system 100 may obtain a predictive drive mode request (202). The predictive drive mode request is a request to predict shift events to automatically transition and change from one driving mode to another driving mode or between different driving modes, such as a sport mode, a sport-plus mode, an economy mode, an economy-plus mode and a normal mode. The automatic shift control system 100 may obtain the predictive drive mode request from user input, for example.

In comparison to the normal mode, the sport mode encourages a vehicle's power train to favor acceleration and power over fuel economy and smoothness. The sport mode maximizes power output of the vehicle 102. The sport mode may increase sensitivity of the acceleration input device, e.g., the gas pedal. In the sport mode, the vehicle 102 may remain in gears slightly longer than in the normal mode. The sport mode increases throttle response to accelerate faster and may change transmission programming to shift at higher, more performance-oriented revolutions-per-minute (RPMs) than the normal mode. The power steering may also increase providing a heavier feel to the steering. A sport-plus mode further enhances and accentuates the above features. The sport mode and the sport-plus mode may result in increased throttle sensitivity and/or a hardening of the suspension tuning to provide the driver with a more engaging driving experience.

The economy mode maximizes the fuel efficiency of the vehicle 102. The fuel efficiency may increase by approximately five percent (5%) relative to normal operation. The economy mode may limit power to accessories, such as the air conditioning, the interior lights, or the radio, to minimize fuel and/or energy consumption. The economy mode may reduce the number of cylinders used by the engine to increase the engine efficiency and/or limit the acceleration of the vehicle 102 by, for example, decreasing the sensitivity of the acceleration input device to increase control over vehicle speed. The economy-plus mode further enhances, employs, and/or accentuates the above features to increase fuel efficiency and/or control over the vehicle 102. Moreover, the economy-plus mode may close grill shutters or increase neutral coasting to increase the fuel efficiency. The fuel efficiency may increase an additional two percent (2%) from the economy mode.

The automatic shift control system 100 may initialize a new route or route set (204). For example, when the vehicle 102 is powered on, when the vehicle 102 begins initial movement after being powered on, when the user interface 130 of the vehicle is activated or when the navigation unit 126 is activated by a user through the user interface 130, the one or more sensors 108 of the automatic shift control system 100 may detect the initialization event. In some implementations, a user interface 130 may receive user input, such as a starting address, that may indicate the beginning of a new route.

The automatic shift control system 100 obtains navigational map information, roadway information, and/or traffic condition information for the vehicle 102 (206). The automatic shift control system 100 may receive the navigational map information, the roadway information, and/or the traffic condition information from the one or more external databases 104, such as from a server of a service provider or an online map service, or from a user interface 130, e.g., a personal mobile device connected through a network 110. The automatic shift control system 100 may extract various factors and/or location of the features from the information received from the one or more external databases 104.

In some implementations, the automatic shift control system 100 retrieves the navigational map information, the roadway information, and/or the traffic condition information from a memory device, either internal or external to the vehicle, or uses the network access device 124 to access an external medium or the one or more external databases 104 to obtain the information. Other sources that the automatic shift control system 100 may obtain the navigational map information, the roadway information and/or the traffic condition information from the user-inputted devices or other computer readable medium, e.g., a flash drive or Universal Serial Bus (USB) memory stick.

In some implementations, the automatic shift control system 100 learns the navigational map information and/or the roadway information by travelling a route and storing the information for one or more features that are identified while travelling the route by one or more sensors 108 in a route history. The one or more sensors 108 may provide the traffic condition information to the ECU 112.

The automatic shift control system 100 obtains vehicle information of the vehicle 102 (208). The vehicle information may include a current date, time, location and speed. The navigation unit 126 may have a Global Positioning Satellite (GPS) device that provides the current location and speed of the vehicle 102, and time and date information including the day of the week. In some implementations, the automatic shift control system 100 may use the network access device 124 to access a server, such as a telecom company, to receive and/or triangulate the location of the vehicle 102.

In some implementations, the automatic shift control system 100 may obtain the vehicle information from an internal clock or one or more sensors 108, e.g., speed from a vehicle speed sensor. The automatic shift control system 100 may obtain the vehicle information from user input, e.g., through the user interface 130. The current time/date may be initialized or pre-set at the factory and may be updated based on user input, the navigational map information, or by connecting to a network 110 through the network access device 124.

The automatic shift control system 100 may determine a route (210). A route is a path for the vehicle 102 to travel between a starting location and a destination location. The destination location and/or path may be user-inputted or predicted. The starting location may be a current location of the vehicle 102.

Figure 5:
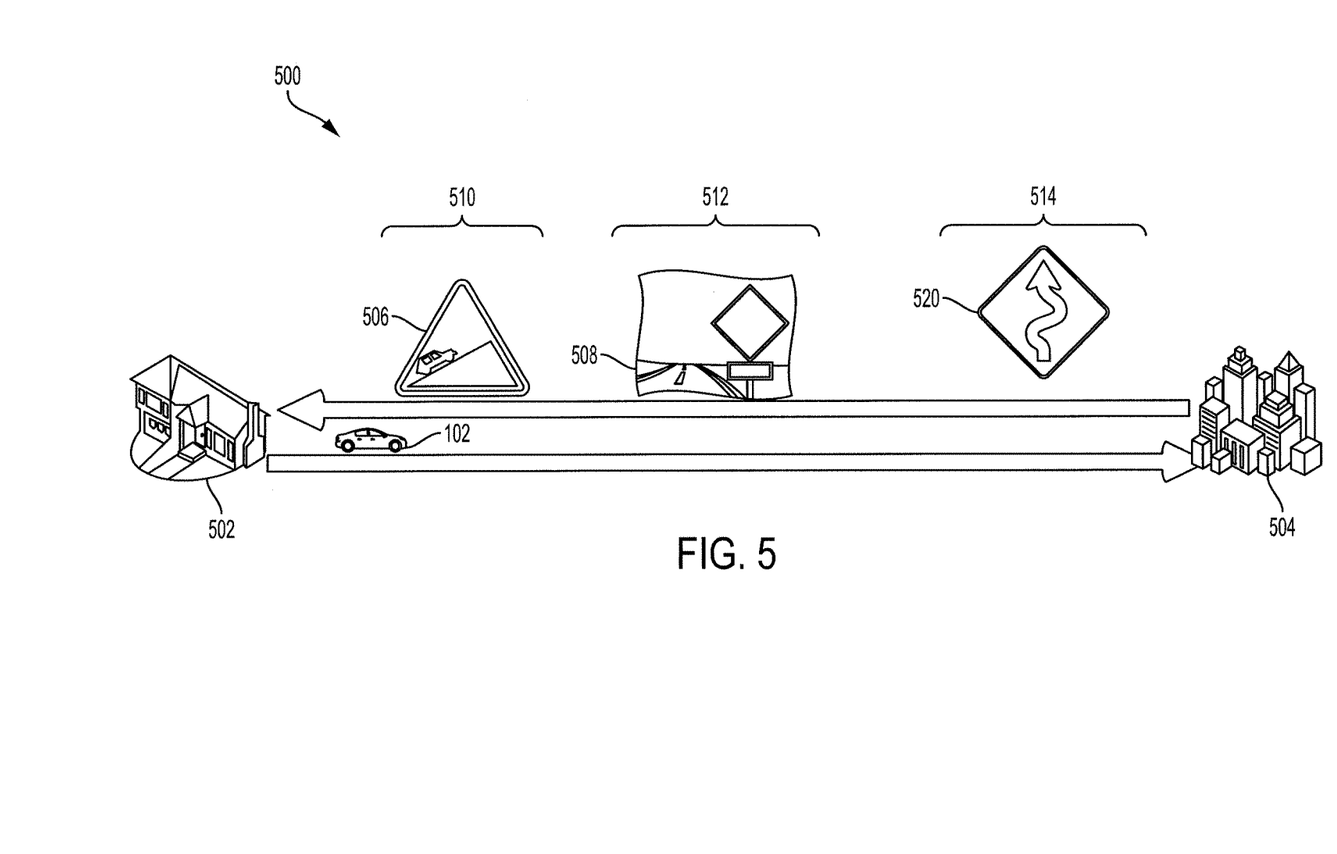
FIG. 5 is an illustration of an example segmented route according to an aspect of the invention.

The automatic shift control system 100, e.g., the navigation unit 126 or the ECU 112, may divide the route into multiple segments based on the navigational map information and/or the roadway information. A segment of the route denotes a portion of the route that the automatic shift control system 100 anticipates a driver will maintain a particular driving mode for the duration of travel on that portion of the route. The automatic shift control system 100 may analyze the route and divide the route into segments in between different roadway features, terrain features and/or political features. The automatic shift control system 100 may identify the different features from the navigational map information and the roadway information by identifying a starting location and an ending location for each segment based on the location of the different features. For example, as shown in FIG. 5, a route 500 between the driver's home 502 and the driver's workplace 504 has a first portion that is a gradually inclining roadway 506, a second portion that is a straight freeway 508, and a third portion that is a curvy windy road 520. The automatic shift control system 100 may divide the route into a first segment 510 that includes the gradually inclining roadway 506, a second segment 512 that is the straight freeway, and a third segment 514 that includes the curvy windy road 520.

Figure 6:
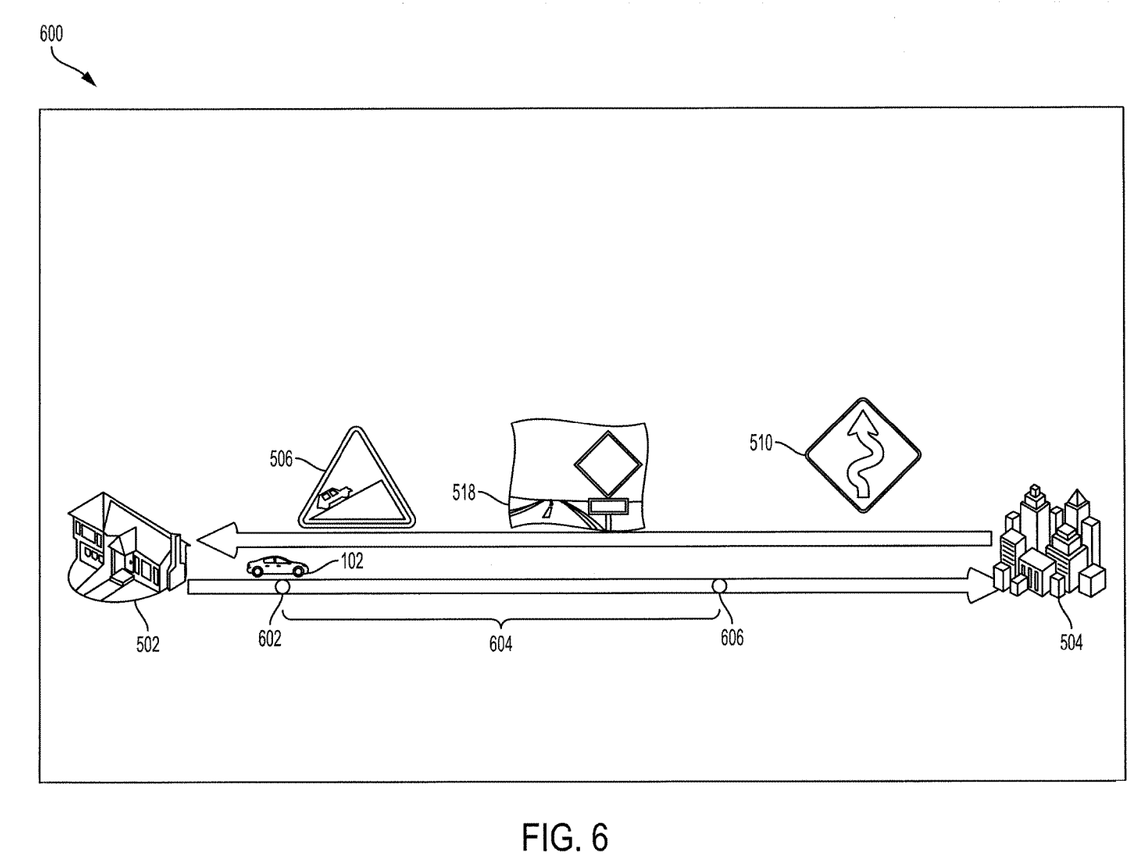
FIG. 6 is an illustration of an example graphical user interface depicting the example segmented route of FIG. 5 according to an aspect of the invention.

In some implementations, the automatic shift control system 100 may receive information from a user interface 130 that defines or sets the different segments of a route, e.g., user input that divides a route into different waypoints. The driver, for example, may select or deselect a user interface element 602 on a graphical user interface 600 to enable or disable a first waypoint that corresponds to the start location of a first segment 604. The driver may select another user interface element 606 to enable or disable a second waypoint that corresponds to the end location of the first segment 604, for example, as shown in FIG. 6. Any number of waypoints may be enabled or disabled along the route to identify different segments.

Figure 3:
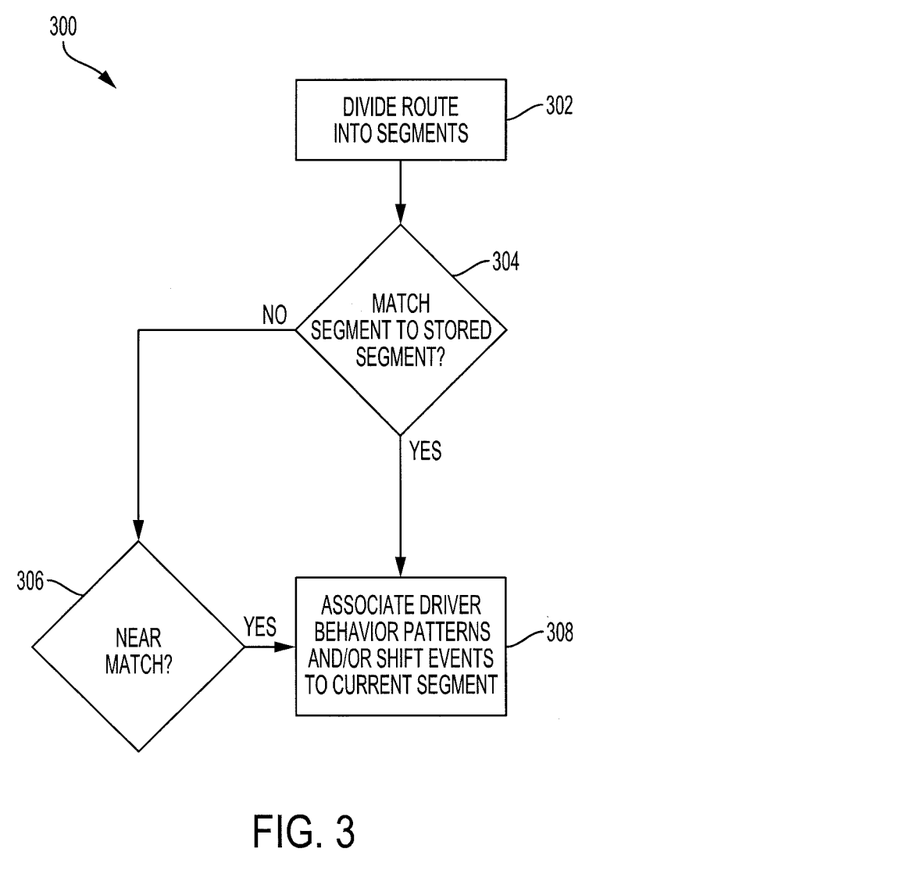
FIG. 3 is a flow diagram of an example process for determining shift events according to an aspect of the invention.

The automatic shift control system 100 determines one or more shift events for the segment of the route (212). That is, the automatic shift control system 100 may predetermine one or more shift events. A shift event is associated with a location (e.g., a beginning of a segment) and a driving mode that the vehicle 102 shifts to at or near the location. FIG. 3 describes the process to determine shift events so that the vehicle 102 may transition or change from one driving mode to another as the vehicle 102 travels the route.

The automatic shift control system 100 may determine a shift event in real-time. The automatic shift control system 100 may compare the current location and/or direction of the vehicle 102 to previously-stored locations of shift events realized using a mapping stored in the memory 122 to determine that there is a shift event at or near the current location of the vehicle 102, e.g., within a threshold distance of the current location of the vehicle 102. The mapping is further described with reference to FIG. 4. In some implementation, the automatic shift control system 100 may analyze current driver behavior patterns to determine a shift event. For example, if a driver is depressing the accelerator and the brake at a rate greater than a threshold amount, the automatic shift control system 100 may set the driving mode to the sport mode and update the shift event in the shift schedule with the driving mode and the location.

The automatic shift control system 100 may determine whether a confidence value for the one or more shift events is greater than or equal to a threshold value (214). A confidence value indicates the likelihood that the driver executes the shift event. The confidence value may be a ratio or a comparison of the number of times a particular shift event was anticipated or predicted and the number of times the particular shift event was realized. A realized shift event occurs when the vehicle 102 transitions to the driving mode associated with the shift event at or near the location of the shift event and the driving mode is not discontinued or changed to a different driving mode until the next shift event.

If the confidence value is less than the threshold value, the automatic shift control system 100 may not assign a driving mode to the shift event or may determine a different driving mode for the shift event.

The automatic shift control system 100 may adjust the driving mode associated with the shift event based on the comparison. For example, if the shift event is first associated with a sport mode, but the driver drives through the shift event in the economy mode a particular number of times, such that the likelihood that the driving mode is in the economy mode at that location is greater than the likelihood that the driving mode is in the sport mode, the automatic shift control system 100 may associate the shift event with the economy mode.

The automatic shift control system 100 updates a shift schedule with the one or more shift events (216). A shift event includes a driving mode and the location of the shift event. The shift schedule may be stored in the memory 122. For example, the shift schedule may contain one or more entries in a table. The one or more entries may have multiple elements, such as a location element that describes the location to transition into a different driving mode, and a driving mode element that describes the driving mode in which the vehicle transitions into.

The automatic shift control system 100 detects that the vehicle 102 is approaching a shift event based on the vehicle's current location and the location of the one or more shift events (218). The vehicle's location may be obtained from the navigation unit 126 and updated periodically. The automatic shift control system 100 compares the vehicle's current location to the location of the one or more shift events, and may identify an approaching shift event by determining that one of the shift events is within a threshold distance of the location of the vehicle 102.

In some implementations, the vehicle 102 may identify an approaching shift event by calculating the time a vehicle will take to reach the predicted shift event using the speed of the vehicle and an estimated distance to the predicted shift event. If the time is below a threshold value, the automatic shift control system 100 may identify the shift event as an approaching shift event. In other implementations, the automatic shift control system 100 identifies an approaching shift event by determining that the distance between the location of the vehicle and a predicted shift event is decreasing and that the predicted shift event is the next shift event along the route.

The automatic shift control system 100 may determine whether there are one or more potential hazards (220). The automatic shift control system 100 may determine whether to shift driving modes based on an approaching shift event and/or one or more potential hazards. The automatic shift control system 100 may identify the one or more potential hazards based on the traffic condition information and/or the roadway information. If there is a potential hazard, the automatic shift control system 100 may delay or cancel shifting of the transmission to a driving mode and/or shift to a different driving mode than the one associated with the shift event. If there is no potential hazard, the automatic shift control system 100 proceeds with changing the driving mode. For example, if a proximity sensor detects that there is another vehicle in front of or within a threshold distance of the vehicle 102 or that the density of traffic surrounding the vehicle 102 is greater than or equal to a threshold amount, the automatic shift control system 100 may delay or cancel shifting from the economy mode to the sport mode.

The automatic shift control system 100 causes the transmission to shift driving modes based on the shift schedule and the location of the vehicle 102 (222). When the vehicle 102 traverses the location of the shift event, e.g., the current location of the vehicle 102 is the same as the location of the shift event, the automatic shift control system 100 sends a signal, such as a transmission shift command, to the transmission 106 to shift the transmission into a different driving mode based on the shift schedule. For example, when the vehicle 102 in FIG. 5 drives past the starting location of the first segment 510 that corresponds to the gradually inclining roadway 506, the vehicle 102 may transition from a normal mode to a sport mode to increase drivability and provide additional engine output to climb the incline. The automatic shift control system 100 may cause the transmission to shift to a different driving mode further based on the one or more identified potential hazards.

The automatic shift control system 100 may request confirmation of the transition to a different driving mode from the driver, e.g., through the user interface 130. The automatic shift control system 100 may override the signal to shift the transmission into a different driving mode based on a lack of a confirmation or user input, e.g., a selection by the driver on the user interface 130 or a selection of a different driving mode by the driver through a user interface element.

FIG. 3 is a flow diagram of an example process 300 for determining shift events for segments of the route. One or more computers or data processing apparatuses, for example, the ECU 112 of the vehicle 102, appropriately programmed, may implement and execute the process 300.

The automatic shift control system 100 divides a current route into multiple segments (302). For each segment, the automatic shift control system 100 compares the segment of the current route to one or more stored segments of previously-travelled routes (304). The automatic shift control system 100 may compare a starting location and/or an ending location of the segment of the current route to the starting location and/or ending location of stored segments of previously-travelled routes, respectively, to determine if there is a matching segment.

In some implementations, the automatic shift control system 100 may compare additional parameters to determine if there is a matching segment. The additional parameters may include a time of day, a day of the week, a direction and/or an identity of a driver. For example, the automatic shift control system 100 may compare an estimated time of day and/or the day of the week of when the vehicle 102 is at or near a starting location of a segment of a current route to a time of day and/or a day of the week of when the segment of the previously-travelled route was travelled. The automatic shift control system 100 may compare the direction the vehicle 102 is or will be travelling on the segment of the current route to the direction the vehicle 102 travelled on the stored segment. In another example, the automatic shift control system 100 compares the identity of the driver travelling the segment of the current route and the identity of the driver of the segment of the previously-travelled route that was stored.

The automatic shift control system 100 may obtain a driver's identity using the one or more sensors 108 and/or the user interface 130, for example, through facial recognition, voice recognition and/or commands, and/or other user input. A user interface 130 may request a driver to login. The login process may include requesting and receiving user identification information, such as a user login and/or a password, to identify the driver. Other forms of user input may include the selection of a button, for example, a memory button on the seat that identifies a specific driver of the vehicle, or voice activation. The automatic shift control system 100 may identify the driver through the connection of a personal device, such as a smartphone or a key fob, to the network access device 124.

If there is no match, the automatic shift control system 100 may analyze the roadway information, the terrain information, the traffic condition information and/or the political information of the segment of the current route to identify a near match with a stored segment (306). The automatic shift control system 100 may assign each factor a weighting and/or a score for the segment of the current route and identify a segment from a previously stored route that has a similar weighting and/or score for the different factors to determine a previous driver behavior pattern or driving mode to associate with the segment of the current route. For example, if the current route includes the first segment 510, the automatic shift control system 100 may identify a stored segment for a previously-travelled route that similarly has a gradual incline with the same or approximately similar degree of incline and use the drive behavior pattern and/or driving mode associated with the identified stored segment to identify a near match with the segment of the current route.

If there is a match or near match, the automatic shift control system 100 associates the driver behavior patterns of the matched segment of the previously-travelled route with the one or more driving modes for the one or more shift events of the segment of the current route (308). In some implementations, the automatic shift control system 100 assigns one or more shift events associated with the matched segment and assigns the associated driving mode of the matched segment to the one or more shift events of the segment of the current route.

Figure 4:
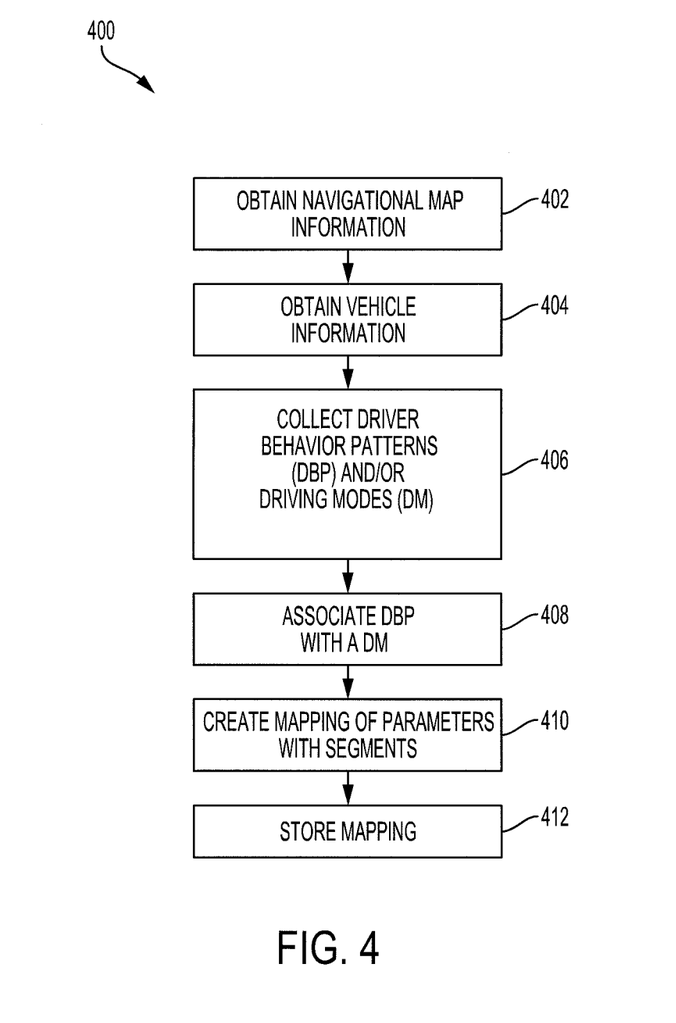
FIG. 4 is a flow diagram of an example process for collecting, storing and associating driver behavior patterns with a driving mode for a shift event according to an aspect of the invention.

The collection and storage of the one or more stored segments of the previously travelled routes and the association of the driver behavior patterns with a driving mode for a shift event of the one or more stored segments is further described in reference to FIG. 4.

FIG. 4 is a flow diagram of an example process 400 for collecting, storing and associating driver behavior patterns with a driving mode of a segment of a route. One or more computers or data processing apparatuses, for example, the ECU 112 of the vehicle 102, appropriately programmed, may implement and execute the process 400.

As a vehicle 102 travels a route, the automatic shift control system 100 obtains navigational map information (402) and vehicle information including the location, direction of travel, time of day and/or day of week (404). The automatic shift control system 100 collects driver behavior patterns and/or the one or more shift events for each segment of a route that the vehicle 102 travels (406). The automatic shift control system 100 may use the navigation unit 126 and/or the one or more sensors 108, e.g., an acceleration input sensor, a braking sensor, a vehicle speed sensor and/or a steering wheel sensor, to detect the driver behavior patterns and/or the one or more shift events to one or more driving modes. The driver behavior patterns may change, for example, based on the time of day and the day of the week because of the amount of traffic on the segment travelled. For example, a driver driving at 8:00 a.m. on a Saturday morning may accelerate faster and corner more aggressively because there is no traffic, whereas a driver driving at 8:00 a.m. on a Monday morning may drive more cautiously because of morning rush hour traffic.

The driver behavior patterns may include at least one of the acceleration data, the braking data, the steering angle data, or the vehicle speed. The acceleration data may include a measure of pressure exerted on the acceleration input device. The braking data may include a measure of pressure exerted on the brake. The measure of pressure may be measured over a period of time or instantaneously. For example, slamming on the brakes exerts more pressure than gradually depressing the brakes over a period of time. The steering angle data may include a measure of the angle of the steering wheel that is exerted by the driver. The vehicle speed may include a measure of speed of the vehicle by using, for example, the rotation of one or more wheels, the location data of the vehicle and/or the engine output speed. The vehicle speed may be an average speed across a segment or an instantaneous speed at a particular location. Other driver behavior patterns may include a yaw rate detected by, for example, a yaw-rate sensor that is a gyroscopic device which measures a vehicle's angular velocity or a measure of the gravitational force exerted when the vehicle 102 is cornering.

The automatic shift control system 100 may receive a user selection of a driving mode initiated by the driver, for example, through a user interface element. For example, a driver may manually select a user interface element to initiate one of the driving modes, such as the economy mode, while driving a segment.

The automatic shift control system 100 may associate the driver behavior pattern with a driving mode (408) by, for example, weighting different parameters of the driver behavior pattern and determining a cumulative score that is associated with a range of scores for each of the different driving modes. The different parameters include vehicle speed, steering wheel angle, rate of acceleration and deceleration, yaw rate and other factors. A high score, e.g., a score of 9 out of 10, for acceleration and/or deceleration may indicate hard acceleration and/or braking and may be associated with a sport or a sport-plus mode until the driver drives less aggressively. In another example, a constant cruising speed with minor adjustments in the steering wheel angle may correspond to an economy or economy-plus mode.

Referring to FIG. 5, during the first segment 510 that is a gradually inclining roadway 506 the driver depresses the accelerator to provide additional power to the engine, the automatic shift control system 100 may correspond the driver behavior patterns to a sport mode, whereas, during the second segment 512 that is the straight freeway and the driver uses the cruise control to coast along the freeway, the automatic shift control system 100 may correspond the coasting to an economy mode due to the relatively stable depression of the accelerator, the lack of depression of the brake and the lack of deviation of the steering angle. Additionally, the automatic shift control system 100 may associate the third segment 514 that is the curvy windy road 520 to the sport mode because of the regular changes in steering angle.

The automatic shift control system 100 creates a mapping of the vehicle information, the one or more driving modes associated with the driver behavior patterns and any manually set driving modes with each segment of the route (410). The automatic shift control system 100 stores the mapping, for example, in the memory 122 (412).

Although the vehicle 102 discussed herein is operated by a driver, the systems and methods may be equally applicable to autonomous and semi-autonomous vehicles.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An automatic shift control system for a vehicle, comprising:
    a transmission configured to provide an engine output for movement of the vehicle;
    a navigation unit configured to obtain navigational information including a current location of the vehicle and a destination location; and
    an electronic control unit (ECU) connected to the navigation unit, the ECU configured to:
        determine a current route having a plurality of segments based on the current location and the destination location,
        determine a shift schedule for the current route that includes a transmission shift command for each segment of the plurality of segments based on a driver behavior pattern, and
        control the transmission to cause shifts of the transmission based on the shift schedule and the current location of the vehicle.

2. The automatic shift control system of claim 1, wherein to determine the shift schedule for the current route the ECU is further configured to match each segment of the current route to a corresponding previously-driven segment.

3. The automatic shift control system of claim 2, wherein to determine the shift schedule for the current route the ECU is further configured to determine each transmission shift command for each segment by associating each driver behavior pattern of the corresponding previously-driven segment with a driving mode.

4. The automatic shift control system of claim 1, further comprising:
    one or more sensors configured to obtain a driver behavior pattern for each previously-driven segment of a plurality of previously-driven segments for a plurality of previously-driven routes; and
    a memory configured to store each driver behavior pattern for each previously-driven segment of the plurality of previously-driven segments.

5. The automatic shift control system of claim 4, wherein each driver behavior pattern is further associated with a time of day and day of week of when the corresponding previously-driven segment of the previously-driven route was driven and the shift schedule is further based on a current time of day and day of week.

6. The automatic shift control system of claim 4, wherein each driver behavior pattern includes at least one of steering angle information, vehicle speed information, or braking information for the previously-driven segment.

7. The automatic shift control system of claim 1, further comprising:
    one or more sensors configured to detect at least one of a road condition or a traffic condition for each segment of the plurality of segments; and
    wherein the shift schedule is further based on the at least one of the road condition or the traffic condition for each segment.

8. The automatic shift control system of claim 7, wherein the road condition includes at least one of a grade level for each segment, a degree of curvature for each segment or an estimated cruising speed for each segment, wherein the traffic condition includes an estimated density of traffic for each segment.

9. The automatic shift control system of claim 1, wherein the each transmission shift command for each segment is a signal to the transmission to enter into a sport mode, a sport-plus mode, an economy mode, an economy-plus mode or a normal driving mode.

10. The method of claim 1, the ECU is further configured to:
    collect a current driver behavior pattern associated with the current route; and
    adjust the shift schedule based on the current driver behavior pattern.

11. A method for controlling an automatic transmission of a vehicle, the method comprising:
    collecting and storing one or more driving modes for a plurality of previously-driven segments for a previously-driven route;
    determining a route having a plurality of segments based on a current location of the vehicle and a destination location;
    determining a driving mode for each segment of the plurality of segments based on the current location and the one or more driving modes for each corresponding previously-driven segment of the plurality of previously-driven segments; and
    controlling operation of the vehicle while traveling each segment of the route based on the driving mode of for each segment.

12. The method of claim 11, wherein storing the one or more driving modes for the plurality of previously-driven segments further comprises:
    associating the one or more driving modes to each previously-driven segment of the plurality of previously-driven segments; and
    storing the association with each previously-driven segment.

13. The method of claim 12, further comprising:
    determining that the vehicle is traveling each segment of the route based on the current location of the vehicle, a starting location of each segment, and the route.

14. The method of claim 13, wherein determining the driving mode for each segment further comprises:
    identifying the corresponding previously-driven segment by matching the starting location and an ending location of each segment with a starting location and an ending location of one of the plurality of previously-driven segments, wherein the matched one of the plurality of previously-driven segments is the corresponding previously-driven segment.

15. The method of claim 12, wherein determining the driving mode of for each segment is further based on the association.

16. The method of claim 11, wherein controlling operation of the vehicle while traveling each segment of the route based on the driving mode for each segment includes adjusting the operation to maximize fuel efficiency or increase drivability of the vehicle.

17. A method for controlling a transmission of a vehicle, the method comprising:
    obtaining navigational information including a current location of the vehicle and a destination location;
    determining a route based on the current location and the destination location;
    determining a plurality of segments for the route based on at least one of the navigational information or user input;
    determining a shift schedule for the route, the shift schedule including a driving mode associated with a transmission shift command for each segment of the plurality of segments, the transmission shift command for each segment of the plurality of segments being based on additional user input.

18. The method of claim 17, wherein determining the plurality of segments for the route based on the navigational information further comprises:
    analyzing road features of the route; and
    segregating the route into the plurality of segments based on the analyzed road features.

19. The method of claim 17, wherein determining the plurality of segments for the route based on the user input further comprises:
    receiving the user input that divides the route into the plurality of segments; and
    segregating the route into the plurality of segments based on the received user input.

20. The method of claim of claim 19, wherein the additional user input includes a user selection of at least one of a sport mode, a sport plus mode, an economy mode, an economy-plus mode or a normal driving mode.

* * * * *